Feb. 17, 1942. R. J. LOUVIAUX ET AL 2,273,716
GLASS CUTTING APPARATUS
Filed Aug. 28, 1940 3 Sheets-Sheet 1

Inventors
RAOUL J. LOUVIAUX,
ARTHUR W. GORALSKE.
By Frank Fraser
Attorney

Feb. 17, 1942.  R. J. LOUVIAUX ET AL  2,273,716
GLASS CUTTING APPARATUS
Filed Aug. 28, 1940  3 Sheets-Sheet 2

Inventors
RAOUL J. LOUVIAUX,
ARTHUR W. GORALSKE.
Frank Fraser
Attorney

Feb. 17, 1942.　　　R. J. LOUVIAUX ET AL　　　2,273,716
GLASS CUTTING APPARATUS
Filed Aug. 28, 1940　　　3 Sheets-Sheet 3

Inventors
RAOUL J. LOUVIAUX,
ARTHUR W. GORALSKE.

By Frank Fraser
Attorney

Patented Feb. 17, 1942

2,273,716

UNITED STATES PATENT OFFICE 2,273,716

GLASS CUTTING APPARATUS

Raoul J. Louviaux and Arthur W. Goralske, Toledo, Ohio, assignors to Libbey-Owens-Ford Glass Company, Toledo, Ohio, a corporation of Ohio Application August 28, 1940, Serial No. 354,564

12 Claims. (Cl. 33—32)

The present invention relates to cutting apparatus in general and more particularly to improvements in apparatus for cutting sheets or plates of glass and the like.

An important object of the invention is the provision of cutting apparatus adaptable for the cutting of glass sheets or plates either transversely or longitudinally into strips of predetermined width or widths or both transversely and longitudinally into rectangular lights or panes.

Another important object of the invention is the provision of cutting apparatus of the above character constructed and operated in such a manner that the sheets or plates of glass may be cut either into strips or rectangular lights or panes rapidly, accurately and efficiently.

Another important object of the invention is the provision of cutting apparatus of the above character capable of cutting the glass sheets or plates into strips or rectangular lights or panes as measured either in even inches or a fraction thereof.

A further important object of the invention is the provision of cutting apparatus of the above character wherein the adjustments required to render the apparatus capable of cutting the glass sheets or plates either into strips or rectangular lights or panes and either in even inches or a fraction thereof may be readily and conveniently effected by the operator without the use of any special tools or equipment, without necessitating any disassembly or reassembly of the apparatus and without the use of any special attachments.

Other objects and advantages of the invention will become more apparent during the course of the following description, when taken in connection with the accompanying drawings.

In the drawings, wherein like numerals are employed to designate like parts throughout the same:

Fig. 11 is a plan view of a glass sheet or plate showing the manner in which it may be cut either into strips or panes of even inches or fractions thereof with the apparatus herein disclosed.

Figure 1:
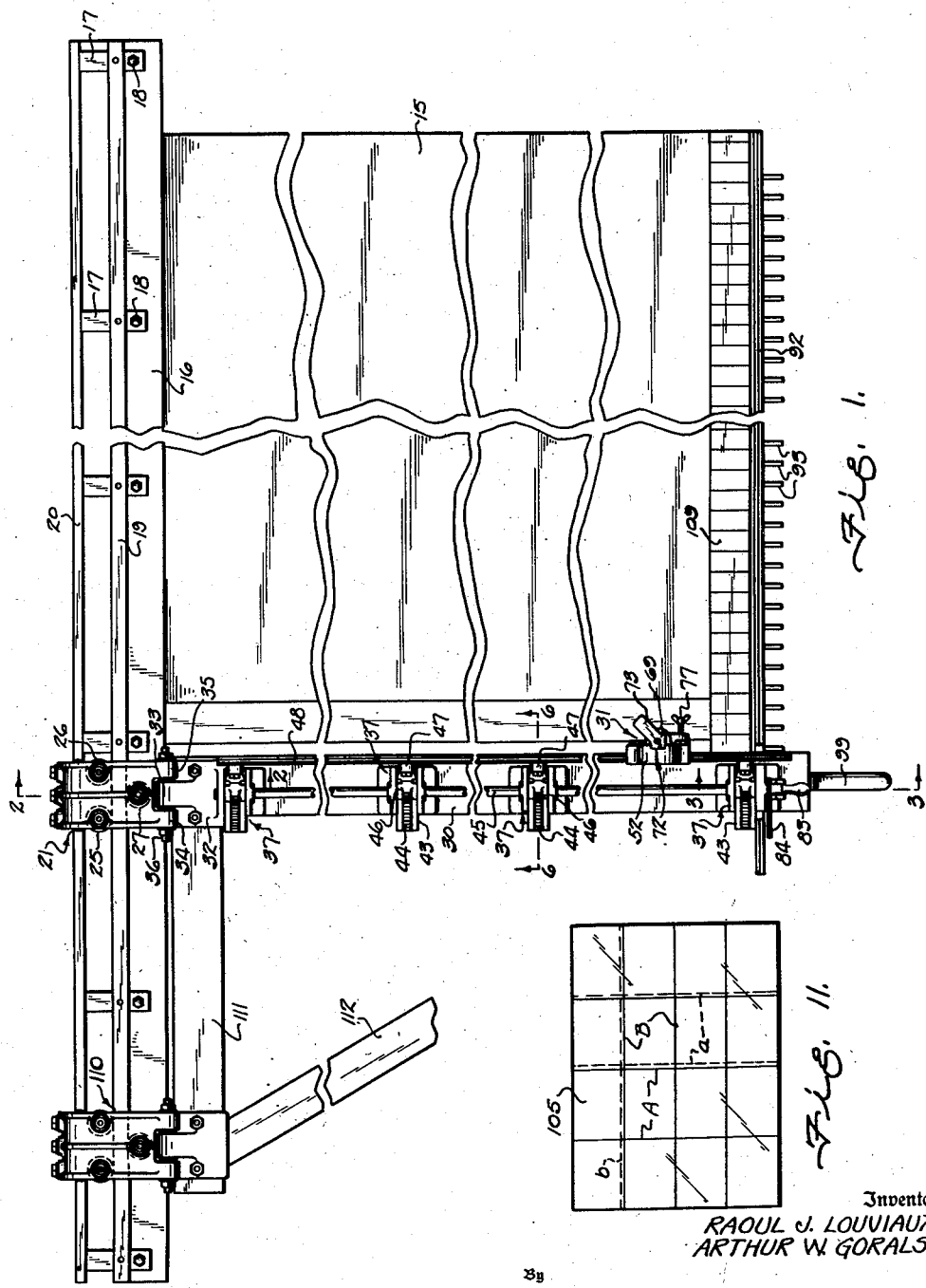
Fig. 1 is a plan view of cutting apparatus constructed in accordance with the invention.
Figure 2:
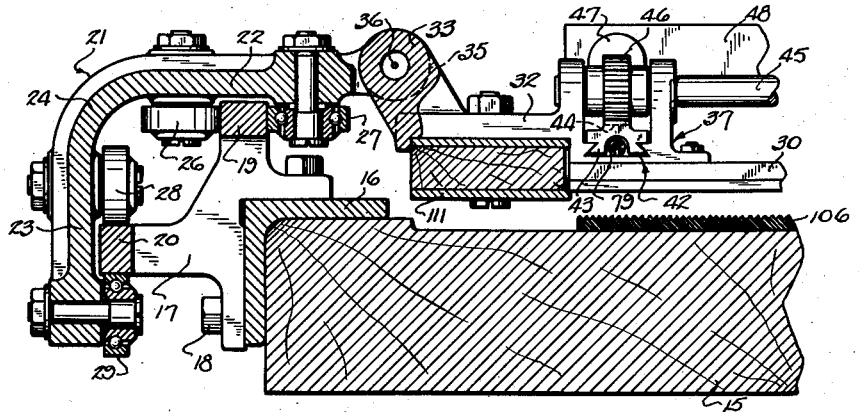
Fig. 2 is a sectional view taken substantially on line 2—2 of Fig. 1.

With reference now to the drawings, the cutting apparatus provided by the present invention comprises a horizontal stationary table 15 for supporting thereon the glass sheet or plate to be cut; said table being of any desired dimensions and mounted in any suitable manner. Extending longitudinally along the rear edge of the table 15 is an angle iron 16 carrying a plurality of spaced bracket members 17 secured to said angle iron 16 by suitable fastening elements 18. Extending parallel with the angle iron 16 and carried by the bracket members 17 are rails 19 and 20 upon which is mounted the cutter carriage 21.

The cutter carriage 21 is in the form of a curved metal plate-like member comprising a substantially horizontal portion 22 and a substantially vertical portion 23 integral with the curved intermediate portion 24. The cutter carriage fits over the rails 19 and 20 and the substantially horizontal portion 22 thereof is provided with spaced rollers 25 and 26 engaging the rear edge of rail 19 and a single roller 27 engaging the forward edge of said rail; said single roller 27 being preferably positioned midway between the spaced rollers 25 and 26 as illustrated in Fig. 1. Carried by the substantially vertical portion 23 of the cutter carriage are spaced rollers 28 engaging the upper face of rail 20 and a single roller 29 engaging the lower face of said rail; said single roller 29 being preferably positioned intermediate the spaced rollers 28.

Pivotally mounted upon the forward end of the cutter carriage 21 is a forwardly extending substantially horizontal cutter support bar 30 carrying the cutting unit designated in its entirety by the numeral 31. Secured to the rear end of the cutter support bar 30 is a hanger bracket 32 provided with an attaching ear 33 which is received between the spaced ears 34 and 35 formed on the cutter carriage 21 and pivotally mounted upon a transverse pin 36 passing through said ears 33, 34 and 35.

Carried by the cutter support bar 30 at spaced points longitudinally thereof are a plurality of substantially U-shaped bearing brackets 37, each comprising a base portion 38 and spaced upstanding bearing portions 39 and 40; said bearing brackets being secured to said cutter support bar by suitable fastening elements 41. The base portion 38 of each bearing bracket 37 is provided with an undercut guide channel 42, extending transversely of the cutter support bar 30, and within which is slidably mounted a supporting element 43 having a base portion shaped to correspond to the undercut guide channel 42 and provided upon its upper surface with a rack portion 44.

Extending longitudinally of the cutter support bar 30 and journaled within the bearing portions 39 and 40 of bearing brackets 37 is a shaft 45 and keyed to said shaft between the spaced bearing portions 39 and 40 of each bearing bracket 37 in a gear 46 meshing with the rack portion 44 of the respective supporting element 43. The supporting elements 43 are provided at their forward ends with upstanding arms 47 and carried by said arms is a horizontal rail 48 secured thereto by suitable fastening elements 49 and extending longitudinally of the cutter support bar 30. The rail 48 is provided in its upper and lower edges with longitudinally extending grooves 50 and 51 respectively and mounted for travel along said rail is the cutting unit 31.

The cutting unit 31 comprises a substantially flat vertical plate or body member 52 provided adjacent its upper end with spaced rollers 53 and 54 which ride upon the upper edge of rail 48 and are received within the groove 50 thereof and adjacent its lower end with spaced rollers 55 and 56 engaging the bottom edge of said rail and received within the groove 51 thereof. With this construction, it will be apparent that the cutting unit 31 can be moved to any desired position along the rail 48 and to facilitate proper positioning of the cutting unit, the rail may be provided with suitable graduations 57.

The cutting unit 31 is also provided intermediate the opposite side edges of body member 52 with a vertically disposed cylindrical portion 58 having a vertical bore 59 therethrough partially closed at its lower end by a plate 60 having an opening 61 therein relatively smaller than and concentric with bore 59. Slidably received within the upper end of bore 59 is a tubular member 62 provided with a reduced lower end portion 63 which extends downwardly through the opening 61 in plate 60 and carries the rotatable steel cutting wheel 64. The cutting wheel 64 is rotatably mounted at the lower end of a ferrule 65, the upper end of which is received within the reduced tubular portion 63 and secured therein by a set screw or the like 66. Encircling the reduced tubular portion 63 within bore 59 is a compression spring 67 which normally acts to force the tubular member 62 upwardly to maintain the cutting wheel 64 in raised inoperative position.

Received within the upper end of tubular member 62 and secured therein by a pin or the like 68 is a substantially square block 69 having the two flat sides 70 and 71 (Fig. 9) arranged at right angles to one another and adapted to be selectively received within a recess 72 formed in the upper end of the body member 52 for a purpose to be more fully hereinafter described. Formed integral with the block 69 is a handle 73.

Figure 9:
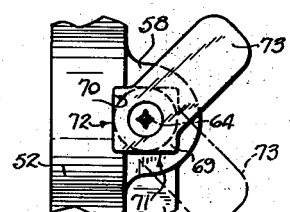
Fig. 9 is a plan view of a portion of the cutting unit.

When the handle 73 is in the full line position shown in Fig. 9, the flat side 70 of block 69 is received within the recess 72, whereas when the handle 73 is swung to the broken line position, the flat side 71 of the block 69 will be received within recess 72. Upon swinging of the handle 73 in this manner, the cutting wheel 64 will be rotated approximately 90 degrees about a vertical axis so that it can be positioned at will to cut the glass sheet or plate supported upon the table 15 either transversely or longitudinally. The pressure of the spring 67 is sufficient to normally maintain the cutting wheel 64 in raised inoperative position but not sufficient to move the block 69 upwardly out of the recess 72. Therefore, in order to turn the cutting wheel 64, the operator must first lift up on the handle 73 to remove the block 69 from the recess 72.

As stated above, the cutting unit 31 can be moved along the rail 48 to any desired position and can then be secured in such position by suitable fastening means. For instance, the cylindrical portion 58 of the cutting unit may be provided with an offset ear 74 having a recess 75 formed therein and within which is received a block 76 carried at the inner end of a screw 77 threaded through said ear 74. Secured to the outer face of block 76 is a pad 78 of rubber, rubber composition, felt or the like adapted to engage the rail 48 upon tightening of screw 77 to clamp the cutting unit in desired position.

The cutting unit 31 can also be moved bodily inwardly or outwardly at right angles with respect to the cutter support bar 30 by adjustment of the rail 48 in a direction transverse to its length. This adjustment is effected by turning shaft 45 which causes rotation of gears 46 and these gears meshing with the rack portions 44 of supporting elements 43 cause said supporting elements to be moved inwardly or outwardly to position the rail 48 and in consequence the cutting unit 31. To maintain the gears 46 and rack portions 44 in firm engagement with one another at all times and to prevent any play therebetween, there is associated with each supporting element 43 a spring 79 secured at one end to a hook 80 carried by said supporting element and at its opposite end to a hook 81 carried by the base portion 38 of the respective bearing bracket 37.

Figure 3:
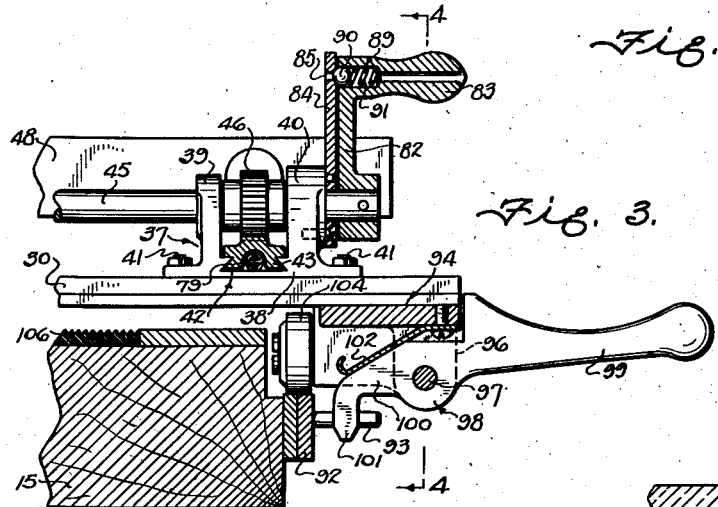
Fig. 3 is a sectional view taken substantially on line 3—3 of Fig. 1.
Figure 5:
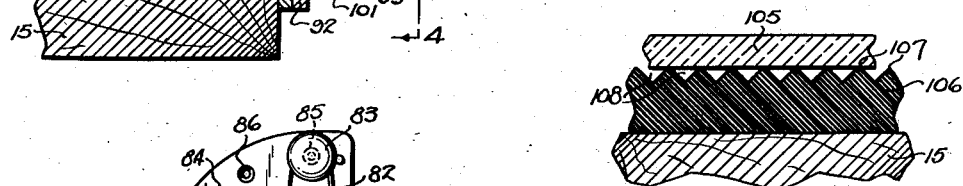
Fig. 5 is an enlarged detail sectional view of the supporting pad for the sheets or plates to be cut.

The means for controlling the rotation of shaft 45 includes a lever 82 fixed to the forward end of said shaft and provided at its upper end with a handle 83 adapted to be grasped by the operator when it is desired to rotate the shaft. Associated with the lever 82 and secured to the adjacent bearing bracket 37 inwardly of said lever (Figs. 3 and 4) is a gage plate 84 provided with four countersunk openings 85, 86, 87 and 88. The inner end of handle 83 is provided with a recess 89 within which is received a ball bearing 90 backed up by a spring 91 which normally urges the ball bearing outwardly of said recess into selective engagement with the openings 85, 86, 87 and 88 in gage plate 84.

Figure 4:
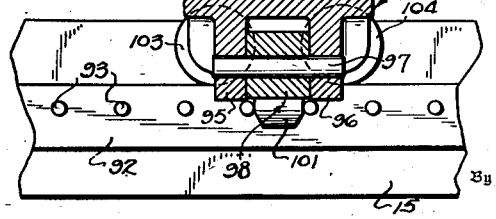
Fig. 4 is a sectional view taken substantially on line 4—4 of Fig. 3.
Figure 6:
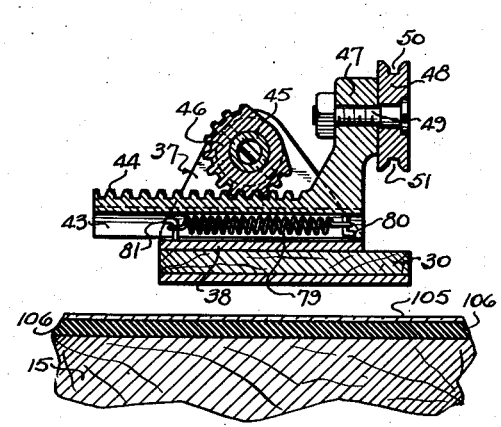
Fig. 6 is a sectional view taken substantially on line 6—6 of Fig. 1.
Figure 7:
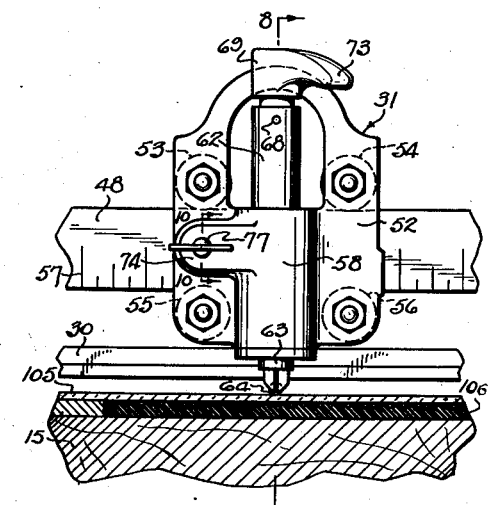
Fig. 7 is a front elevation of the cutting unit.

The cutting table 15 is provided along its forward edge with a horizontal rail 92 and secured to said rail are a series of spaced forwardly projecting gage pins 93 preferably spaced one inch apart. Carried upon the underside of the cutter support bar 30 forwardly of the cutting table is a bracket 94 having spaced depending legs 95 and 96 between which extend a horizontal pin 97. Mounted upon the pin 97 is a lever 98 formed at its outer end with a handle 99 and at its inner end with a catch 100 having a downturned end 101 of such size as to be snugly received between two adjacent gage pins 93 as shown in Fig. 4. The inner end of the lever 98 is normally held downwardly by a leaf spring 102 secured to the underside of bracket 94. The cutter support bar 30 is supported at its forward end by spaced rollers 103 and 104 which are suitably carried by the bracket 94 and ride along upon the upper edge of rail 92.

The sheet or plate of glass or the like to be cut is indicated at 105 and is supported horizontally upon the table 15. Heretofore, it has been customary to cover the upper surface of the table with a pad of felt or the like upon which the glass sheet is laid during cutting. However, it has been found that upon scoring and breaking of the glass sheet small particles of glass are very apt to drop upon the felt pad and which cause the scratching of subsequent sheets of glass which are cut upon the table. In order to obviate this difficulty, there is herein provided a relatively thick pad 106 preferably of rubber, rubber composition or the like and formed in its upper surface with a plurality of spaced substantially parallel ribs 107 resulting in substantially V-shaped grooves 108 therebetween. With such a pad, any small particles of glass which may result from the scoring and breaking of the sheet will be received within the grooves 108 and will therefor not mar or scratch subsequent sheets of glass positioned for cutting upon the upper edges of the ribs 107. The pad can of course be periodically cleaned to remove any particles of glass from the grooves 108.

In the operation of the apparatus above described, the cutter support bar 30 is first moved along the rails 19, 20 and 92 to one side of the table 15 as shown in Fig. 1. The glass sheet 105 to be cut is then laid horizontally upon the pad 106 carried by the table 15, whereupon the operator may then actuate the apparatus to cut the sheet either longitudinally or transversely into strips of the desired width or both longitudinally and transversely into rectangular lights or panes. By "transversely" is meant from front to rear of the table 15, while by "longitudinally" is meant from one end of the table to the opposite end thereof. When cutting the glass sheet transversely into strips, the handle 73 of cutting unit 31 is moved to the full line position shown in Fig. 9, with the flat side 70 of block 69 received within recess 72. When thus positioned, the axis of rotation of the cutting wheel 64 will extend at right angles to the rail 48.

The operator then grasps the handle 99 of lever 98 and pushes downwardly thereon to move the downturned end 101 of catch 100 above the gage pins 93 and at the same time moves the cutter support bar 30 to the right along rails 19 and 20 at the rear end thereof and rail 92 at the forward end to the desired position depending upon the width of strip to be cut. When the cutter support bar 30 reaches the desired position, the operator releases handle 99 whereupon the spring 102 will force the downturned end 101 of catch 100 downwardly between two adjacent gage pins 93 as shown in Fig. 4 whereby to lock the cutter support bar against further movement. When thus properly positioned, the operator forces the handle 73 of the cutting unit 31 downwardly to lower the cutting wheel 64 into cutting position and moves said unit along rail 48 to effect the cutting of the sheet along a line extending from the front to the rear of the table. After the cut has been made, the operator can move the cutter support bar 30 to the next position and the sheet scored along a line parallel with the first score line. This operation can be repeated as often as desired to cut the sheet into a plurality of strips of predetermined width or widths. To facilitate the positioning of the cutter support bar, there is carried upon the table 15 along the forward edge thereof a suitably graduated scale 109.

Figure 10:
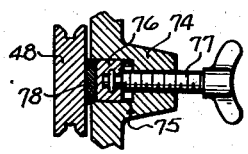
Fig. 10 is a detail sectional view taken substantially on line 10—10 of Fig. 7.
Figure 8:
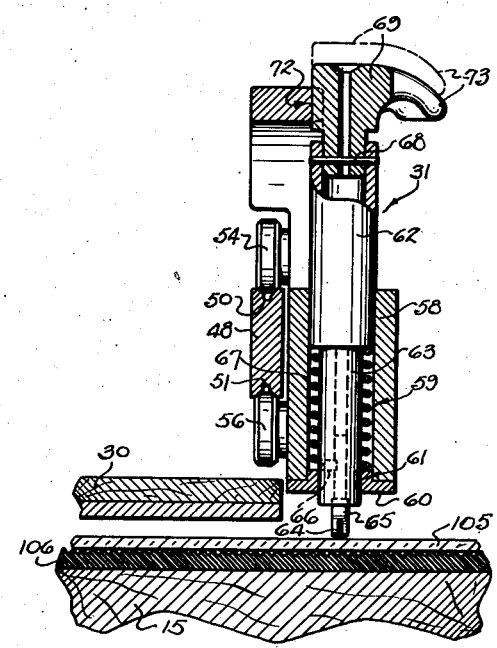
Fig. 8 is a sectional view taken substantially on line 8—8 of Fig. 7.

If, after the glass sheet has been cut into strips, it is then desired to cut these strips to form rectangular lights or panes, the handle 73 of cutting unit 31 is swung to broken line position in Fig. 9 whereupon the axis of rotation of cutting wheel 64 will extend parallel with the rail 48. The cutting unit can then be moved along the rail to the desired position and secured in place by the clamping means illustrated in Fig. 10. The operator then presses downwardly upon handle 99 of lever 98 and moves the cutter stop bar longitudinally of the table at the same time pressing downwardly upon the handle 73 of cutting unit 31 to maintain the cutting wheel 64 in engagement with the glass sheet to score the same. This longitudinal cutting operation can then be repeated as desired to effect the cutting of the sheet along a plurality of longitudinal lines depending upon the number and/or sizes of panes to be cut.

As pointed out above, with the present apparatus, it is possible to cut the glass sheet into strips of accurate sizes as measured in even inches or a fraction thereof. To this end, the gage pins 93 are located one inch apart and the rail 48 is also adjusted by turning shaft 45 so that when the cutter support bar 30 is located by the gage pins 93, the cutting unit will cut the sheet into strips of even inches. At such time, the lever 82 is in the position shown in full lines in Fig. 4 with the ball bearing 90 held by the spring 91 within opening 85 in gage plate 84. However, if it is desired to cut strips as measured in one or more inches and a quarter the lever 82 is swung to the left (Fig. 4) until the ball bearing 90 snaps into opening 86. Such movement of the lever 82 will cause the shaft 45 to be rotated sufficiently to move the rail 48 outwardly or away from the cutter support bar 30 a quarter of an inch. On the other hand, if the sheets are to be cut into strips measuring one or more inches and a half, the lever 82 is moved to bring the ball bearing 90 within opening 87, while, if the sheets are to be cut into strips measuring one or more inches and three-quarters the lever 82 is swung to bring ball bearing 90 into opening 88. In this way, the glass sheet can be cut into strips not only as measured in even inches but also in fractions thereof. Likewise, it is possible to cut the glass sheet longitudinally into panes of fractions of an inch by proper positioning of the cutting unit along the rail 48 during the longitudinal cutting operation; the positioning of the cutting unit being facilitated by the graduations 57 on rail 48. Obviously, the apparatus may also be employed for cutting the sheet longitudinally only into a plurality of strips of the desired width or widths.

In Fig. 11 is illustrated diagrammatically a glass sheet scored both longitudinally and transversely. The transverse score lines dividing the glass sheet into a plurality of strips as measured in even inches are indicated at A, while the broken lines *a* indicate transverse lines of cut when the sheet is cut into strips measuring one or more inches and a fraction. On the other hand, the longitudinal score lines indicated B divide the transverse strips into a plurality of panes as measured in even inches, while the broken lines *b* indicate longitudinal lines of cut for separating the transverse strips into panes measuring one or more inches and a fraction.

For the purpose of stabilizing the cutting unit to prevent undue vibration during the cutting operation, there may be mounted upon the rails 19 and 20 a second or auxiliary carriage 110 similar to cutter carriage 21; said auxiliary carriage 110 being connected with cutter carriage 21 by a strut 111 and a diagonal brace 112 may also be used to connect the auxiliary carriage 110 with the cutter support bar 30 adjacent the forward end of the latter.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for cutting sheets or plates of glass and the like, a table for horizontally supporting the sheet or plate to be cut, a cutter support bar mounted above said table, means for supporting said cutter support bar for movement across said table, supporting elements movably carried by said cutter support bar and each being provided with a rack portion, a rail carried by said supporting elements and extending longitudinally of said cutter support bar, a cutting unit mounted for movement along said rail and including a cutting tool, a shaft carried by said cutter support bar, gears fixed to said shaft and meshing with the rack portions of said supporting elements, means for rotating said shaft to effect actuation of said supporting elements to move said rail bodily horizontally toward or away from the said cutter support bar including a handle keyed to one end of said shaft, a stationary gage plate associated with said handle, and coacting means carried by said handle and gage plate for securing said rail in predetermined adjusted position upon turning of said shaft.

2. In apparatus for cutting sheets or plates of glass and the like, a table for horizontally supporting the sheet or plate to be cut, a cutter support bar extending transversely above said table, means for supporting said cutter support bar at its opposite ends for movement longitudinally across said table, supporting elements slidably carried by said cutter support bar for movement transversely thereof and each being provided with a rack portion, a rail extending longitudinally of said cutter support bar and carried by said supporting elements, a cutting unit mounted for movement along said rail and including a cutting tool, a shaft also extending longitudinally of and carried by said cutter support bar, gears fixed to said shaft and meshing with the rack portions of said supporting elements, means for rotating said shaft to actuate said supporting elements simultaneously to move said rail inwardly or outwardly with respect to said cutter support bar and at substantially right angles with respect thereto including a handle keyed to one end of said shaft, a stationary gage plate associated with said handle and having a plurality of openings therein, and means carried by said handle and adapted for selective engagement within said openings upon turning of said shaft to secure said rail in predetermined adjusted position.

3. In apparatus for cutting sheets or plates of glass and the like, a table for supporting the sheet or plate to be cut, and a pad upon said table for supporting said sheet or plate thereon during cutting, said pad being formed of a yieldable cushioning material and provided with grooves upon its upper surface for receiving particles of glass or the like therein resulting from the cutting operation.

4. In apparatus for cutting sheets or plates of glass and the like, a table for supporting the sheet or plate to be cut, and a pad upon said table for supporting said sheet or plate thereon during cutting, said pad being formed of a yieldable cushioning material and provided upon its upper surface with a plurality of spaced ribs for supporting the sheet or plate thereupon and resulting in substantially V-shaped grooves therebetween for receiving particles of glass or the like resulting from the cutting operation.

5. In apparatus for use in the cutting of sheets or plates of glass and the like, a table for horizontally supporting the sheet or plate to be cut, a cutting unit, and means for mounting said cutting unit for movement in two directions at substantially right angles to one another across said table, said cutting unit comprising a supporting body member provided with a vertical cylindrical portion, a tubular member slidable and rotatable within said cylindrical portion and carrying a cutting tool at its lower end, a block carried at the upper end of said tubular member and having two flat faces disposed at right angles to one another, and a recess formed in said supporting body member for receiving either side face of the block therein upon rotation of said tubular member and cutting tool carried thereby 90 degrees.

6. In apparatus for use in the cutting of sheets or plates of glass and the like, a table for horizontally supporting the sheet or plate to be cut, a cutting unit, and means for mounting said cutting unit for movement in two directions at substantially right angles to one another across said table, said cutting unit comprising a supporting body member provided with a vertical cylindrical portion, a tubular member slidable and rotatable within said cylindrical portion and carrying a cutting tool at its lower end, a block carried at the upper end of said tubular member and having two flat faces disposed at right angles to one another, and a recess formed in said supporting body member for receiving either side face of the block therein upon rotation of said tubular member and cutting tool carried thereby 90 degrees, and spring means mounted within said cylindrical portion for normally urging said tubular member upwardly to maintain the cutting tool in raised inoperative position.

7. In apparatus for cutting sheets or plates of glass and the like, a table for horizontally supporting the sheet or plate to be cut, a cutter support bar extending transversely above said table, means for supporting said cutter support bar at its opposite ends for movement longitudinally across said table, a rail extending longitudinally of and carried by said cutter support bar, a cutting unit mounted for movement along said rail and including a cutting tool, a plurality of spaced horizontal gage pins carried along the forward edge of said table, a catch pivotally carried by said cutter support bar and having a portion thereof adapted to be snugly received between two adjacent gage pins for securing said cutter support bar against movement, and spring means carried by said cutter support bar and acting to normally urge said catch into engagement with said gauge pins.

8. In apparatus for cutting sheets or plates of glass and the like, a table for horizontally supporting the sheet or plate to be cut, a cutter support bar mounted above said table, means for supporting said cutter support bar for movement across said table, supporting elements movably carried by said cutter support bar and each being provided with a rack portion, a rail carried by said supporting elements and extending longitudinally of said cutter support bar, a cutting unit mounted for movement along said rail and including a cutting tool, a shaft carried by said cutter support bar, gears fixed to said shaft and meshing with the rack portions of said supporting elements, means for rotating said shaft to effect actuation of said supporting elements to move said rail bodily horizontally toward or away from said cutter support bar, and coacting means carried by the said cutter support bar and shaft for securing the said rail in predetermined adjusted position upon turning of said shaft.

9. In apparatus for cutting sheets or plates of glass and the like, a table for supporting the sheet or plate to be cut, and a pad upon said table for supporting said sheet or plate thereon during cutting, said pad being provided with recesses upon its upper surface for receiving particles of glass or the like therein resulting from the cutting operation.

10. In apparatus for use in the cutting of sheets or plates of glass and the like, a table for horizontally supporting the sheet or plate to be cut, a cutting unit, and means for mounting said cutting unit for movement in two directions at substantially right angles to one another across said table, said cutting unit comprising a supporting body member provided with a vertical cylindrical bore, a vertical cylindrical member slidable and rotatable within said bore carrying a cutting tool at its lower end and provided at its upper end with two flat faces disposed at right angles to one another, and a recess formed in said supporting body member for receiving either of said flat faces therein upon rotation of said vertical cylindrical member and cutting tool carried thereby 90 degrees.

11. In apparatus for cutting sheets or plates of glass and the like, a table for horizontally supporting the sheet or plate to be cut, cutter support means extending transversely above said table, means for supporting said cutter support means for movement longitudinally across said table, a cutting unit mounted for movement along said cutter support means and including a cutting tool, a plurality of spaced horizontal gage pins carried along the forward edge of said table, a catch pivotally carried by said cutter support means and having a portion thereof adapted to be received between two adjacent gage pins for securing said cutter support means against movement, and means carried by said cutter support means acting to normally urge said catch into position between said gage pins.

12. In apparatus for cutting sheets or plates of glass and the like, a table for horizontally supporting the sheet or plate to be cut, cutter support means extending transversely above said table, means for supoprting said cutter support means for movement longitudinally across said table, a cutting unit mounted for movement along said cutter support means and including a cutting tool, a plurality of spaced horizontal gage pins carried along the forward edge of said table, a catch pivotally carried by said cutter support means and having a portion thereof adapted to be snugly received between two adjacent gage pins for securing said cutter support means against movement, and spring means carried by said cutter support means acting to normally urge said catch into engagement with said gage pins.

RAOUL J. LOUVIAUX.
ARTHUR W. GORALSKE.